United States Patent
Yokoyama

(10) Patent No.: US 10,369,916 B2
(45) Date of Patent: Aug. 6, 2019

(54) VEHICULAR ARTICLE-ACCOMMODATING STRUCTURE, ARM REST, AND VEHICULAR SEAT

(71) Applicant: TACHI-S CO., LTD., Akishima-shi, Tokyo (JP)

(72) Inventor: Takashi Yokoyama, Akishima (JP)

(73) Assignee: TACHI-S CO., LTD., Akishima-Shi, Tokyo (JP)

(*) Notice: Subject to any disclaimer, the term of this patent is extended or adjusted under 35 U.S.C. 154(b) by 16 days.

(21) Appl. No.: 15/730,359

(22) Filed: Oct. 11, 2017

(65) Prior Publication Data
US 2018/0105088 A1 Apr. 19, 2018

(30) Foreign Application Priority Data
Oct. 13, 2016 (JP) .................................. 2016-201858

(51) Int. Cl.
*B60N 3/10* (2006.01)
*B60N 2/75* (2018.01)

(52) U.S. Cl.
CPC ............. *B60N 3/105* (2013.01); *B60N 2/793* (2018.02); *B60N 3/101* (2013.01); *B60N 3/102* (2013.01)

(58) Field of Classification Search
CPC ........ B60N 3/105; B60N 3/101; B60N 3/102; B60N 2/793
USPC ....................................................... 296/37.8
See application file for complete search history.

(56) References Cited

U.S. PATENT DOCUMENTS

| 5,318,343 A | * | 6/1994 | Spykerman | ............ | B60N 3/106 297/188.16 |
| 5,845,888 A | * | 12/1998 | Anderson | .............. | B60N 3/102 248/311.2 |
| 10,023,088 B2 | * | 7/2018 | Anderson | ................. | B60R 7/04 |
| 2010/0066113 A1 | * | 3/2010 | Browne | ................. | B60N 3/102 296/24.34 |
| 2018/0162250 A1 | * | 6/2018 | Dinant | ...................... | B60N 2/77 |
| 2018/0162251 A1 | * | 6/2018 | Bohlke | ................... | B60N 2/757 |

FOREIGN PATENT DOCUMENTS

DE 10138292 A1 * 3/2003 ............. B60N 3/102
JP 2007-331400 A 12/2007

* cited by examiner

*Primary Examiner* — Pinel E Romain
(74) *Attorney, Agent, or Firm* — McGinn IP Law Group, PLLC.

(57) ABSTRACT

A vehicular article-accommodating structure, includes a lid front part provided with an opening of such size as to be larger than the cross-sectional diameter of a cup but also capable of preventing tipping and falling of the cup, a link mechanism for causing the lid front part to perform a translational movement between a first position and a second position, and a lower part of a bottom part and an upper part of a bottom part for receiving the bottom surface of the cup at the first position and the second position. The second position is a high position having a height greater than that of the first position, and is a position rearward from the first position. The height of the lid front part can be changed by a prescribed distance, and the distance from the lid front part to a passenger can be reduced by a prescribed distance.

15 Claims, 20 Drawing Sheets

F I G . 13A
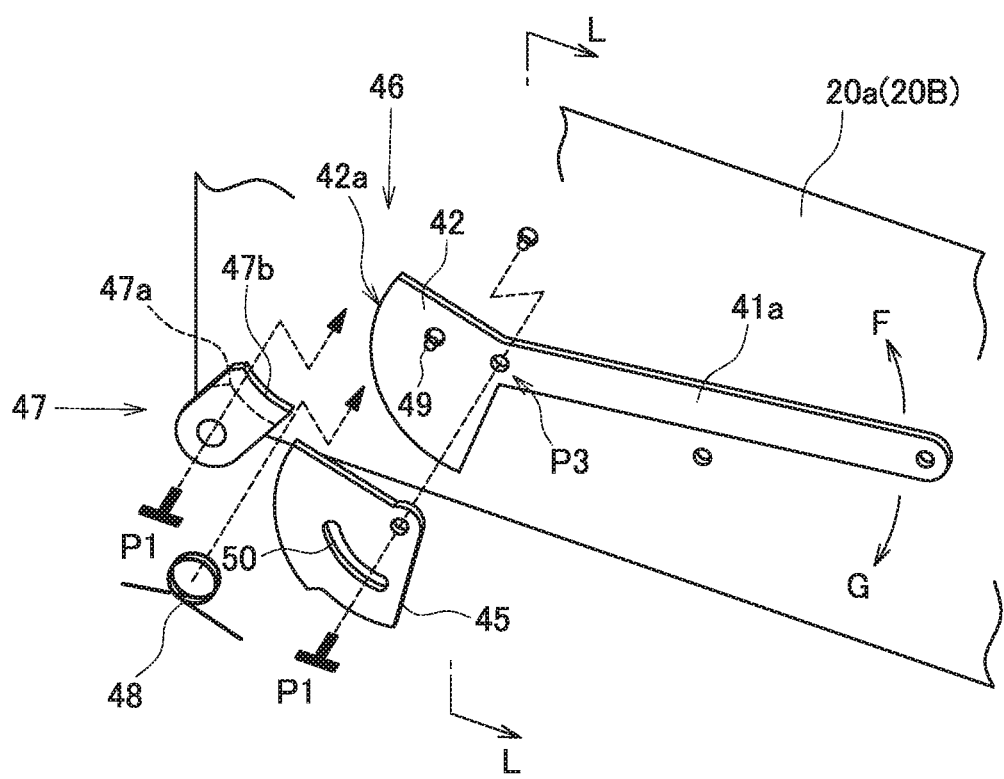

F I G . 13B
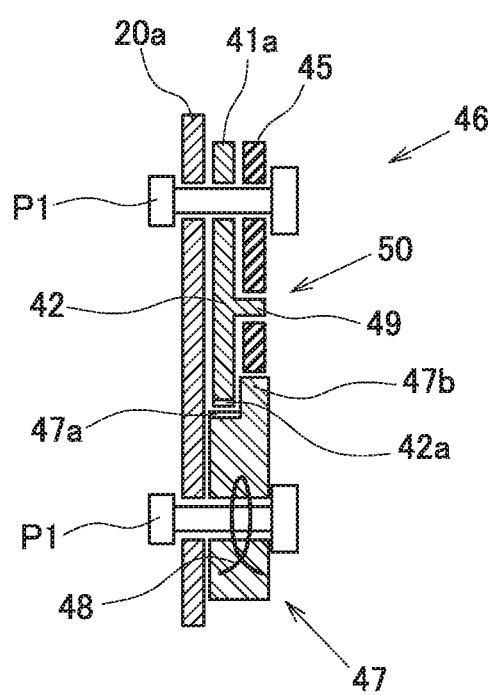

VEHICULAR ARTICLE-ACCOMMODATING STRUCTURE, ARM REST, AND VEHICULAR SEAT

BACKGROUND OF THE INVENTION

Field of the Invention

The present invention relates to an article-accommodating structure for accommodating an article such as a beverage container, wherein the vehicular article-accommodating structure is used in a vehicle such as an automobile, a train, or an airplane. The present invention also relates to an arm rest that is a vehicular component for receiving an arm of a passenger, wherein the vehicular article-accommodating structure described above is used in the arm rest. The present invention furthermore relates to a vehicular seat on which a passenger in a vehicle sits, wherein the vehicular article-accommodating structure described above is used in the vehicular seat.

Description of the Related Art

The vehicular article-accommodating structure described above is a structure for accommodating an article such as a cup or a beverage container. This vehicular article-accommodating structure is used in, e.g., a component such as an arm rest or a console attached to a vehicular seat that is a constituent element of a vehicle.

A known vehicular article-accommodating structure is disclosed in patent citation 1 (JP-A 2007-331400). Using symbols employed in patent citation 1 with being enclosed in parentheses, patent citation 1 discloses a vehicular seat provided with an arm rest (14). The arm rest (14) has cup holders (19, 20) for accommodating cups (C1, C2) that serve as articles being accommodated. The cup holders serve as vehicular article-accommodating structures.

In the vehicular seat disclosed in patent citation 1, as schematically illustrated in FIG. 14 of the present application, the height H1 and the distance D1 of a cup holder 101 with respect to a passenger P are constantly fixed. Therefore, in cases where the physical build of a passenger differs, cases where a child safety seat is used, cases where a booster seat is used, etc., the height H1 of and distance D1 to the cup holder 101 with respect to the passenger P do not conform to the passenger P; as a result, a problem is presented in that the cup holder 101 is not easy for the passenger P to use.

PATENT REFERENCES (Patent Citation 1): JP-A 2007-331400

SUMMARY OF THE INVENTION

The present invention was designed in view of the problem in conventional devices as described above, the purpose of the present invention being to provide a vehicular article-accommodating structure, an arm rest, and a vehicular seat that can be made suitably easy to use by individual passengers having different physical builds.

A first vehicular article-accommodating structure according to the present invention comprises: an article support member provided with an opening of such size as to be larger than the cross-sectional diameter of an article being accommodated but also configured to prevent tipping and falling of the accommodated article; an article-support-member movement device for causing the article support member to perform a translational movement between a first position and a second position; and an article-bottom-surface-receiving member for receiving the bottom surface of the accommodated article between the first position and the second position. The second position is a high position having a height greater than that of the first position, and is a position rearward from the first position.

According to this vehicular article-accommodating structure, the article support member can be positioned at the first position (lower forward position) or the second position (higher rearward position), as needed by passengers having different physical builds. Therefore, it is possible for passengers to use the structure with suitable ease.

A second aspect of the first vehicular article-accommodating structure comprises a case for which the article support member serves as a cover. The first position is a position at which the article support member is the cover for the case. According to this configuration, the vehicular article-accommodating structure fits into the case, therefore facilitating handling.

In a third aspect of the first vehicular article-accommodating structure, the article-bottom-surface-receiving member is a tiered configuration or a stepped shape provided to the case. According to this configuration, the bottom surface of the accommodated article can be received by separate step portions in the stepped shape.

In a fourth aspect of the first vehicular article-accommodating structure, the article-support-member movement device is a parallel link mechanism provided between the case and the article support member. According to this configuration, the article support member can easily be moved by a simple mechanism that takes up little space.

In a fifth aspect of the first vehicular article-accommodating structure, the link angle of the parallel link mechanism is set so as to be inclined rearward when the second position is assumed. According to this configuration, the article support member can be prevented from erroneously falling.

A sixth aspect of the first vehicular article-accommodating structure comprises a lid that serves as a cover for the case. The lid has a lid front part and a lid rear part connected so as to be capable of pivoting relative to each other. The lid front part constitutes the article support member. The lid rear part constitutes part of the parallel link mechanism. According to this configuration, the vehicular article-accommodating structure is structured such that only the case and the cover are externally visible, therefore forming a structure that is very easy to handle.

In a seventh aspect of the first vehicular article-accommodating structure, the lid rear part comprises a tab at the portion where the lid rear part and the lid front part are connected. According to this configuration, a passenger can operate the vehicular article-accommodating structure by using the tab, therefore making operation by the passenger easier.

In an eighth aspect of the first vehicular article-accommodating structure, the lid front part comprises a recess at a position corresponding to the tab, the recess accommodating the tab, and the recess is of such size as to allow part of a finger to be inserted around the tab. According to this configuration, the external appearance of the vehicular article-accommodating structure can satisfactorily maintained because the tab does not protrude to the exterior. Additionally, a suitable aperture is provided around the tab, therefore eliminating any worsening of operability of the tab.

A second vehicular article-accommodating structure according to the present invention comprises an article support member provided with an opening of such size as to be larger than the cross-sectional diameter of an article being accommodated but also capable of preventing tipping and falling of the accommodated article, an article-support-member movement device for causing the article support member to perform a translational movement between a first position and a second position, a ratchet device for allowing the article support member to move from the first position to the second position and inhibiting the article support member from moving from the second position to the first position, and an article-bottom-surface-receiving member for receiving the bottom surface of the accommodated article between the first position and the second position. The second position is a high position having a height greater than that of the first position, and is a position rearward from the first position.

According to this vehicular article-accommodating structure, the working of the ratchet device inhibits the article support member from moving so as to return from the second position to the first position, therefore making it possible to move the article support member to height positions that vary continuously. Therefore, the article support member can be positioned at a suitable position that is suited to the physical build of the passenger.

A second aspect of the second vehicular article-accommodating structure comprises a case for which the article support member serves as a cover, the first position being a position at which the article support member is the cover for the case. According to this configuration, the vehicular article-accommodating structure fits into the case, therefore facilitating handling.

In a third aspect of the second vehicular article-accommodating structure, the article-support-member movement device is a parallel link mechanism provided between the case and the article support member. According to this configuration, the article support member can easily be moved by a simple mechanism that takes up little space.

In a fourth aspect of the second vehicular article-accommodating structure, the article-bottom-surface-receiving member performs a translational movement synchronously with the article support member. According to this configuration, the bottom surface of an article can be received at heights that vary continuously.

A fifth aspect of the second vehicular article-accommodating structure comprises a lid that serves as a cover for the case, the lid having a lid front part and a lid rear part connected so as to be capable of pivoting relative to each other, the lid front part constituting the article support member, and the lid rear part constituting part of the parallel link mechanism. According to this configuration, the vehicular article-accommodating structure is structured such that only the case and the cover are externally visible, therefore forming a structure that is very easy to handle.

In a sixth aspect of the second vehicular article-accommodating structure, the lid rear part comprises a tab at the portion where the lid rear part and the lid front part are connected. According to this configuration, a passenger can operate the vehicular article-accommodating structure by using the tab, therefore making operation by the passenger easier.

In a seventh aspect of the second vehicular article-accommodating structure, the lid front part comprises a recess at a position corresponding to the tab, the recess accommodating the tab, and the recess is of such size as to allow part of a finger to be inserted around the tab. According to this configuration, the external appearance of the vehicular article-accommodating structure can satisfactorily maintained because the tab does not protrude to the exterior. Additionally, a suitable aperture is provided around the tab, therefore eliminating any worsening of operability of the tab.

An arm rest according to the present invention for receiving an arm of a passenger comprises a vehicular article-accommodating structure for accommodating an article being accommodated, and the vehicular article-accommodating structure is the first vehicular article-accommodating structure or second vehicular article-accommodating structure described above. According to this arm rest, the article support member can be positioned at the first position (lower forward position) or the second position (higher rearward position), as needed by passengers having different physical builds. Therefore, it is possible for passengers to use the structure with suitable ease.

A vehicular seat according to the present invention comprises a seat cushion for receiving the buttocks of a passenger, a seat back for receiving the back of the passenger, and a vehicular article-accommodating structure for accommodating an article being accommodated, wherein the vehicular article-accommodating structure is the first vehicular article-accommodating structure or second vehicular article-accommodating structure described above. According to this vehicular seat, the article support member can be positioned at the first position (lower forward position) or the second position (higher rearward position), as needed by passengers having different physical builds. Therefore, it is possible for passengers to use the structure with suitable ease.

Effect of the Invention

According to the vehicular article-accommodating structure, arm rest, and vehicular seat of the present invention, an article support member can be positioned at a first position (lower forward position) or a second position (higher rearward position), as needed by passengers having different physical builds. Therefore, it is possible for passengers to use the structure with suitable ease.

BRIEF DESCRIPTION OF THE DRAWINGS

FIG. 13A is an exploded perspective view of the ratchet mechanism used in the vehicular article-accommodating structure in FIG. 9A;

FIG. 13B is a cross-sectional view along line L-L in FIG. 13A; and

DESCRIPTION OF THE PREFERRED EMBODIMENTS

A vehicular article-accommodating structure, an arm rest, and a vehicular seat according to the present invention are described below on the basis of embodiments. As shall be apparent, the present invention is not limited to these embodiments. Additionally, there are cases where the drawings annexed to the present specification show constituent elements in proportions different from those actually used, in order to facilitate understanding of the characteristic portions.

(First Embodiment)

Figure 1:
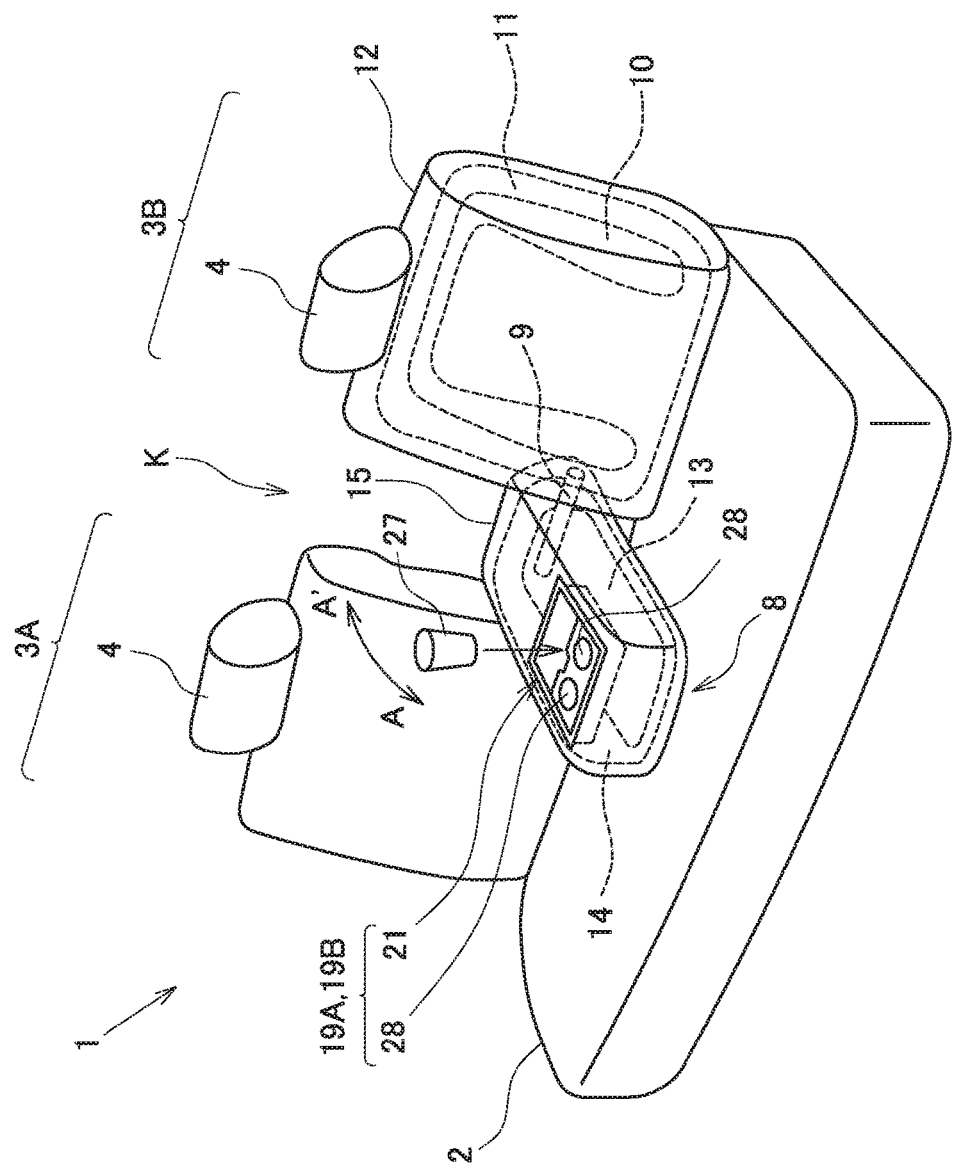
FIG. 1 is a perspective view of one embodiment of a vehicular article-accommodating structure, an arm rest, and a vehicular seat according to the present invention.

FIG. 1 shows one embodiment of a vehicular seat, an arm rest, and a vehicular article-accommodating structure according to the present invention. The vehicular seat 1 shown in FIG. 1 is a rear seat of an automobile that is an example of a vehicle. As shall be apparent, the present invention can also be applied to a front seat of a vehicle. The vehicle seat 1 has a seat cushion 2 for receiving the buttocks of passengers, and seat backs 3A, 3B for receiving the backs of passengers. Headrests 4 for receiving the heads of passengers are provided to the top part of the seat backs 3A, 3B.

A space K is provided between the left and right seat backs 3A, 3B. An arm rest 8 is provided within the space K. A shaft member 9 is provided to the right-side seat back 3B. The shaft member 9 is secured to a seat back frame 10 that is a framework structure of the seat back 3B. The seat back 3B is configured by mounting a pad 11 around the seat back frame 10 and then covering the pad 11 with a surface skin 12. The seat back 3A is configured in the same manner.

The shaft member 9 secured to the seat back frame 10 extends into the space K. The arm rest 8 is supported by the shaft member 9 so as to be capable of rotating, as shown by arrows A-A'. The arm rest 8 in FIG. 1 has been caused to pivot in the direction of the arrow A, and has reached a position at which the arm rest 8 is in a horizontal state. This position is the usage position of the arm rest 8. When the arm rest 8 is in the usage position, a passenger can place his or her arm, and in particular the elbow, on the upper surface of the arm rest 8 and reach a comfortable orientation.

It is possible for the arm rest 8 to be caused to pivot in the direction of the arrow A' and to reach a position at which the arm rest 8 stands upward within the space K. This position is the non-usage position of the arm rest 8. When the arm rest 8 is in the non-usage position, the upper surface of the seat cushion 2 is opened so as to be wider.

The arm rest 8 has: a frame 13 that is a framework structure; a pad 14 mounted around the frame 13, a pad 14 forming the external shape of the arm rest 8; and a surface skin 15 for covering the pad 14.

The seat back frame 10 and the frame 13 of the arm rest 8 are formed from a metal or a hard synthetic resin. The pad 11 and the pad 14 are formed from an elastic material, e.g., urethane foam. The surface skin 12 and the surface skin 15 are formed from an air-permeable material, e.g., fabric, leather, synthetic leather, or the like. The fabric is a cloth, the cloth being a woven fabric, a knitted fabric, lace, felt, or a nonwoven fabric.

(Vehicular Article-accommodating Structure)

Figure 2A:
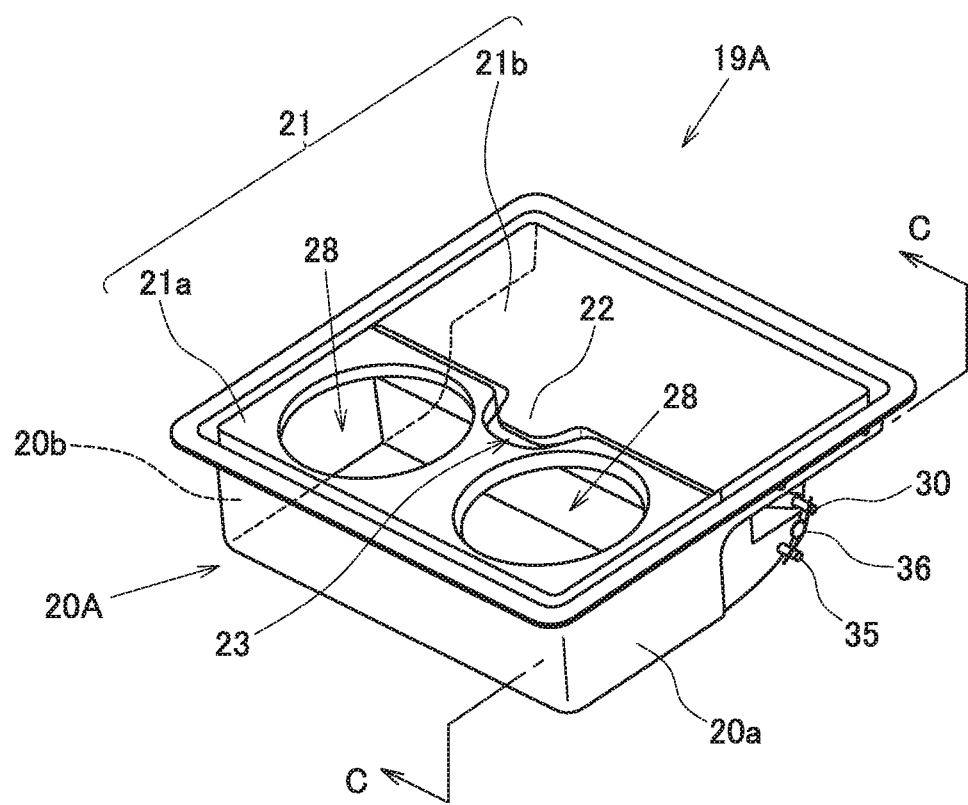
FIG. 2A is a perspective view of the vehicular article-accommodating structure in FIG. 1, shown in enlarged form.
Figure 3A:
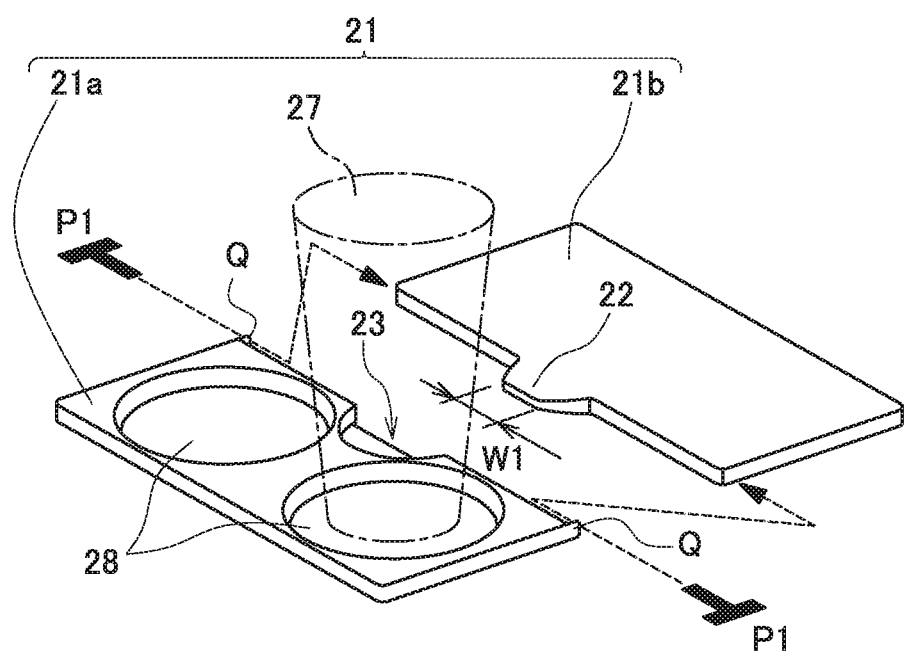
FIG. 3A is a perspective view of the structure of a lid that is one component of the structure in FIG. 2A.

A vehicular article-accommodating structure 19A is provided to the upper surface of the arm rest 8 in the usage position shown in FIG. 1. As shown in FIG. 2A, the vehicular article-accommodating structure 19A has a case 20A and a lid 21. The lid 21 constitutes a lid (cover) of the case 20A. As shown in FIG. 3A, the lid 21 has a lid front part 21a serving as an article support member, and a lid rear part 21b functioning as a link in part of a horizontal link mechanism.

An opening 28 for accommodating a beverage container; i.e., a cup 27 that serves as an article being accommodated, is opened in the lid front part 21a. The number of openings 28 can be selected as desired; in the present embodiment, two openings 28 are provided. The size (i.e., diameter) of the openings 28 is greater than the cross-sectional diameter of the cup 27, but is also set such that tipping and falling of the cup 27 can be prevented (i.e., the cup 27 can be prevented from tipping and falling over).

The two sides of the rear end of the lid front part 21a and the two sides of the front end of the lid rear part 21b are pivotably connected to each other by pins P1, P1. Therefore, the lid front part 21a and the lid rear part 21b are capable of relative pivoting about a connection point Q due to the respective weights thereof, as shown by arrows B-B' in FIG. 3B. Due to this relative pivoting, the lid 21 constitutes a structure that can undergo medial folding at the location of the connection point Q.

Figure 3B:
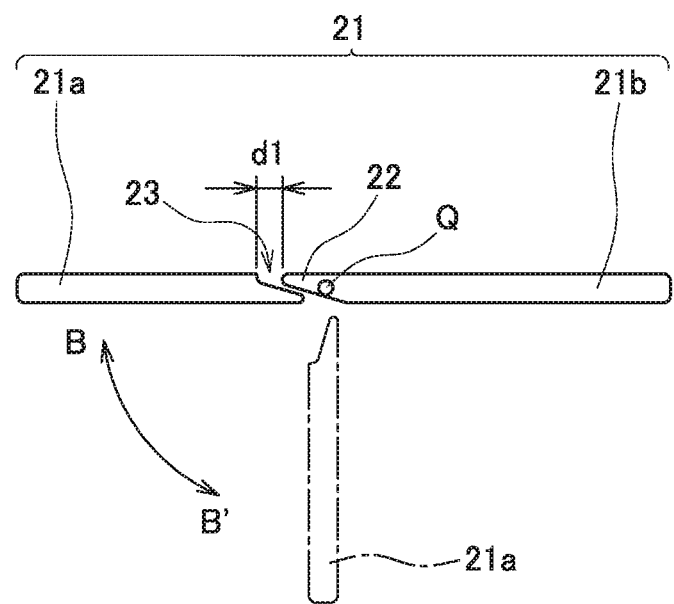
FIG. 3B is a view of the operation of the lid.

A tab 22 is provided at the central part of the front end of the lid rear part 21b. The upper surface of the tab 22 and the upper surface of the lid rear part 21b are the same surface. The width W1 of the front end of the tab 22 is substantially equal to the width of the index finger of an adult human, e.g., 5-20 mm. A recess 23 is provided to the lid front part 21a in a region that corresponds to the tab 22. The recess 23 accommodates the tab 22 when the lid front part 21a and the lid rear part 21b are connected to each other. The planar size of the recess 23 is such that a gap d1 into which part of the distal end of a human finger can be inserted is formed around the tab 22, as shown in FIG. 3B.

Figure 2B:
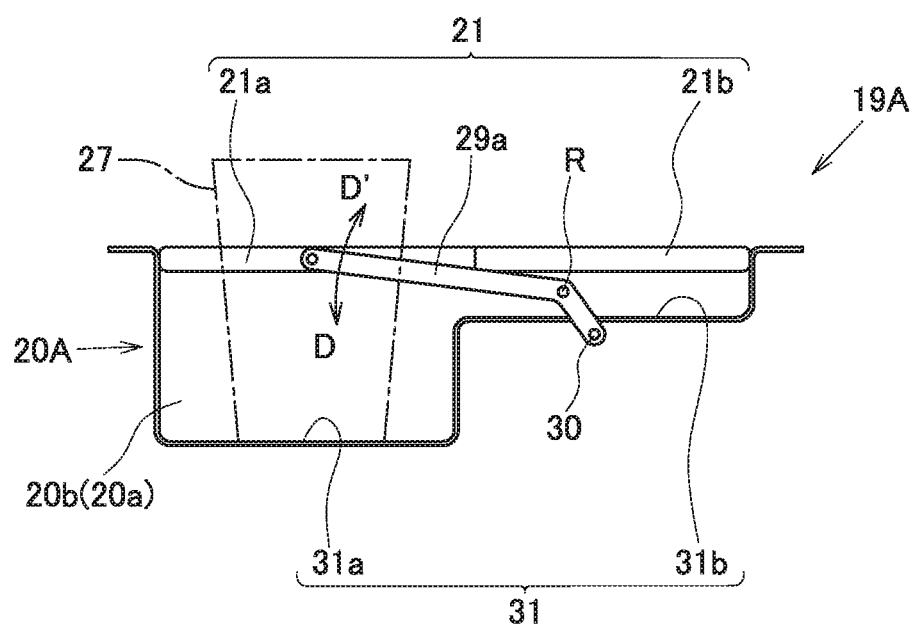
FIG. 2B is a cross-sectional view along line C-C in FIG. 2A.
Figure 4:
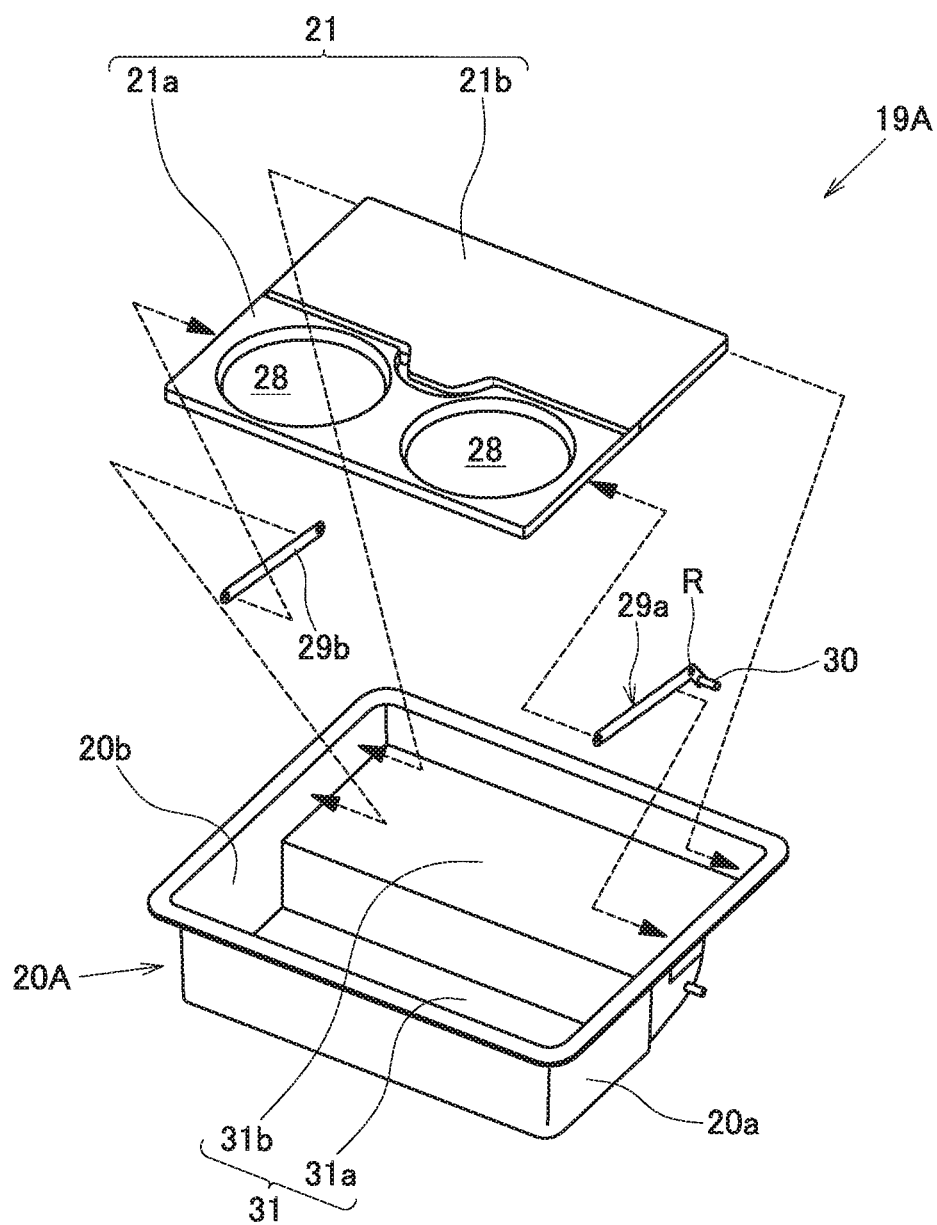
FIG. 4 is an exploded perspective view of the vehicular article-accommodating structure in FIG. 2A.

FIG. 2B is a cross-sectional view along line C-C in FIG. 2A. A bent link 29a is provided between the lid front part 21a and side surfaces 20a, 20b of the case 20A in FIG. 2A, as shown in FIG. 2B. FIG. 4 is an exploded perspective view of the vehicular article-accommodating structure 19A in FIG. 2A. FIG. 2B shows the link 29a only on the side-surface 20a side, but a similar link 29b is provided on the corresponding side-surface 20b side, as shown in FIG. 4. The rear-end-side end part of the link 29a constitutes a bent part. The other link 29b does not have a bent part, and thus constitutes a linear link.

A point R near the bending point of the bent link 29a is rotatably connected to the case side surface 20a. A pin 30 is provided to the rear end of the link 29a. The pin 30 extends to outside of the case side surface 20a, as shown in FIG. 2A.

In FIG. 4, the distal endpoint of the bent link 29a is pivotably connected to one point on the side surface of the lid front part 21a. One point on the rear end of the linear link 29b is rotatably connected to the case side surface 20b. The distal endpoint of the linear link 29b is pivotably connected to one point on the side surface of the lid front part 21a. The rear endpoints of two surfaces of the lid rear part 21b are pivotably connected to the inner surfaces of the rear end parts of the case side surfaces 20a, 20b.

In the connection configuration described above, a parallel link mechanism for the lid front part 21a is configured from the bent link 29a, the linear link 29b, and the lid rear part 21b. The working of the parallel link mechanism causes the lid front part 21a to perform a translational movement between a first position shown in FIG. 2A and a second position shown in FIG. 5. The first position shown in FIG. 2A is a position at which the lid front part 21a functions, together with the lid rear part 21b, as a cover for the case 20A. The second position of the lid front part 21a shown in FIG. 5 is a position at which the height of the lid front part 21a is greater than at the first position shown in FIG. 2A by an amount H2, and furthermore is a position (i.e., a rearward position) at which the lid front part 21a has advanced closer to the passenger than at the first position shown in FIG. 2A by a distance D2.

Figure 5:
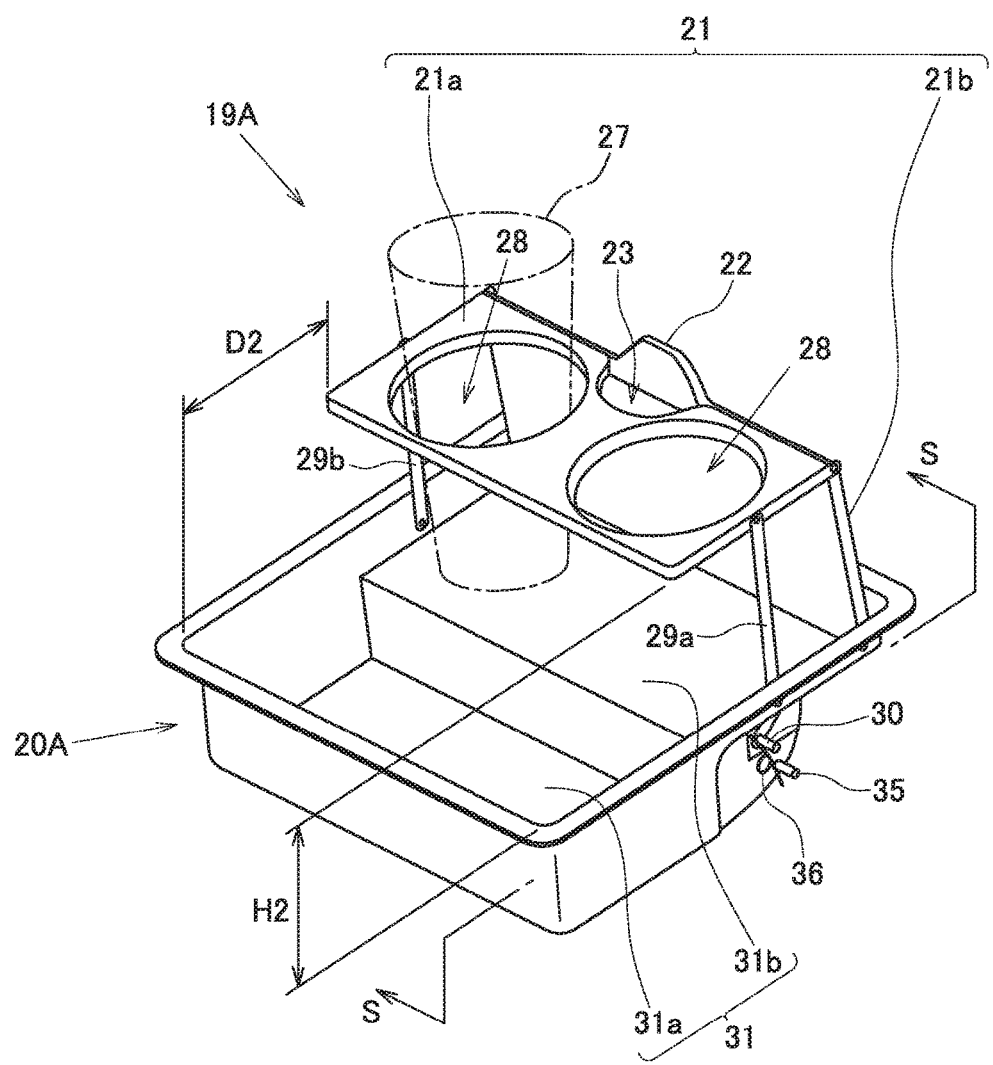
FIG. 5 is a perspective view showing movement of the vehicular article-accommodating structure in FIG. 2A.
Figure 6:
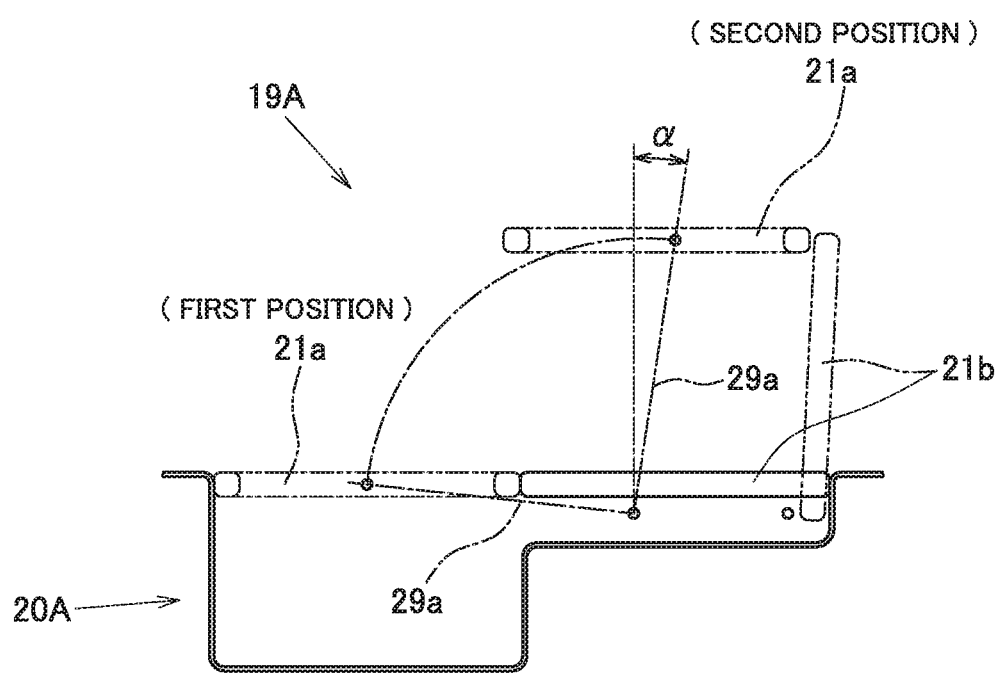
FIG. 6 is a schematic view showing movement of the vehicular article-accommodating structure in FIG. 2A.

FIG. 6 schematically shows movement of the bent link 29a. In FIG. 6, when the lid front part 21a is raised to the second position, the bent link 29a is inclined rearward by angle α from a vertical state, where "inclined rearward" refers to a state of being tilted toward the rear. When the cup 27 serving as the article being accommodated in FIG. 3 is not successfully inserted into an opening 28, an unexpected force could be applied downward from above to the lid front part 21a. In such a case, if the bent link 29a disposing the lid front part 21a at the second position has been disposed in the vertical state, the lid front part 21a could faultily fall downward. However, in the present embodiment, the bent link 29a disposing the lid front part 21a at the second position is set so as to be inclined rearward at the angle α from the vertical state. This rearward inclination makes it possible to prevent the lid front part 21a from faultily moving downward (i.e., to prevent faulty closing of the cover by the lid front part 21a, even if an unexpected force is applied downward from above to the lid front part 21a at the second position, such as when the cup 27 is not successfully inserted into an opening 28 (see FIG. 5).

Figure 7:
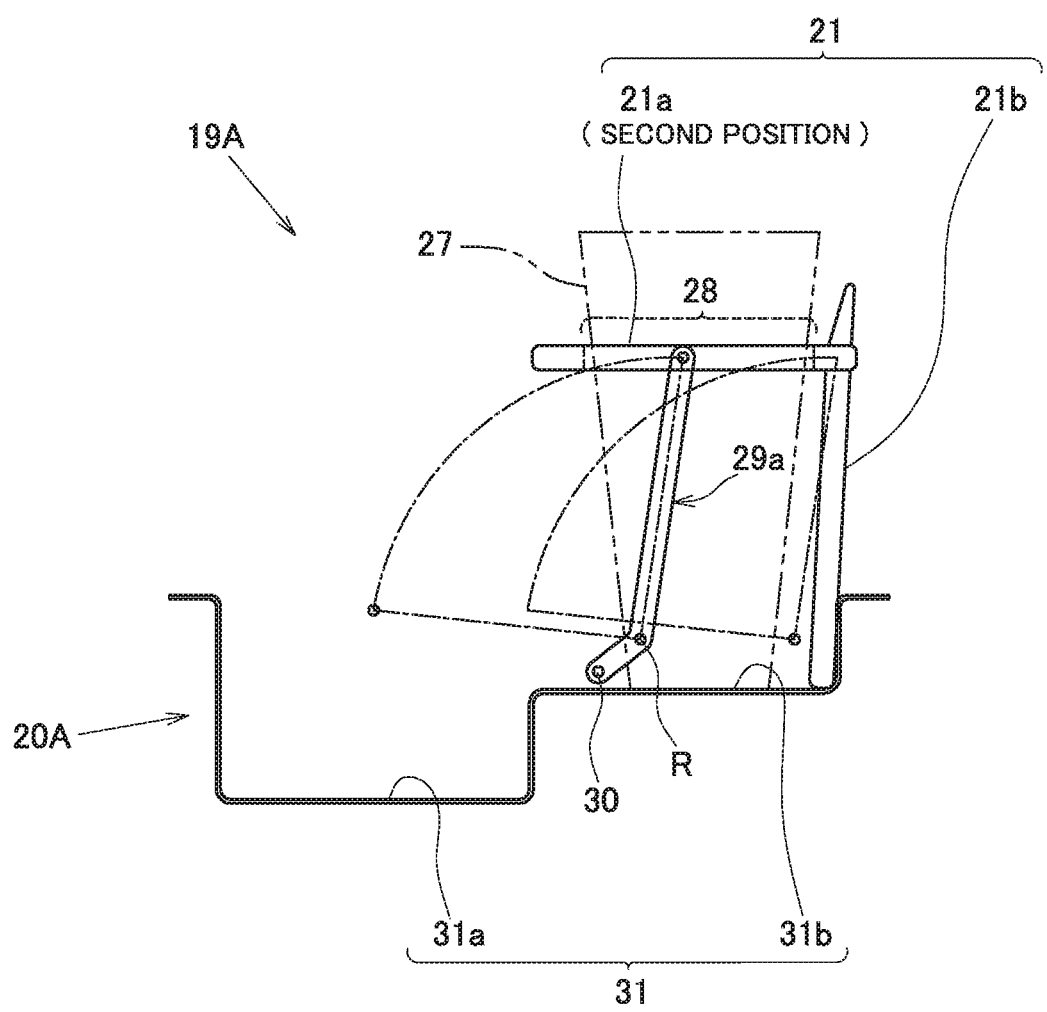
FIG. 7 is a cross-sectional view along lie S-S in FIG. 5.

As shown in FIG. 5, a bottom part 31 of the case 20A has a stepped shape or a tiered configuration having a lower part 31a and an upper part 31b. The lower part 31a functions as an article-bottom-surface-receiving member for receiving the bottom surface of the cup 27 inserted into an opening 28 (see FIG. 2A) in the lid front part 21a disposed at the first position in FIG. 2B. In FIG. 7, the upper part 31b functions as an article-bottom-surface-receiving member for receiving the bottom surface of the cup 27 inserted into an opening 28 in the lid front part 21a disposed at the second position.

(Urging of Link)

The pin 30 (also referred to as a "link pin" below) provided to the bent link 29a in FIG. 4 extends to outside of the case side surface 20a through an opening in FIG. 2A. A case pin 35 extending outward is provided to the case side surface 20a. A coil spring 36 is provided between the link pin 30 and the case pin 35 as an elastic urging member.

Figure 8:
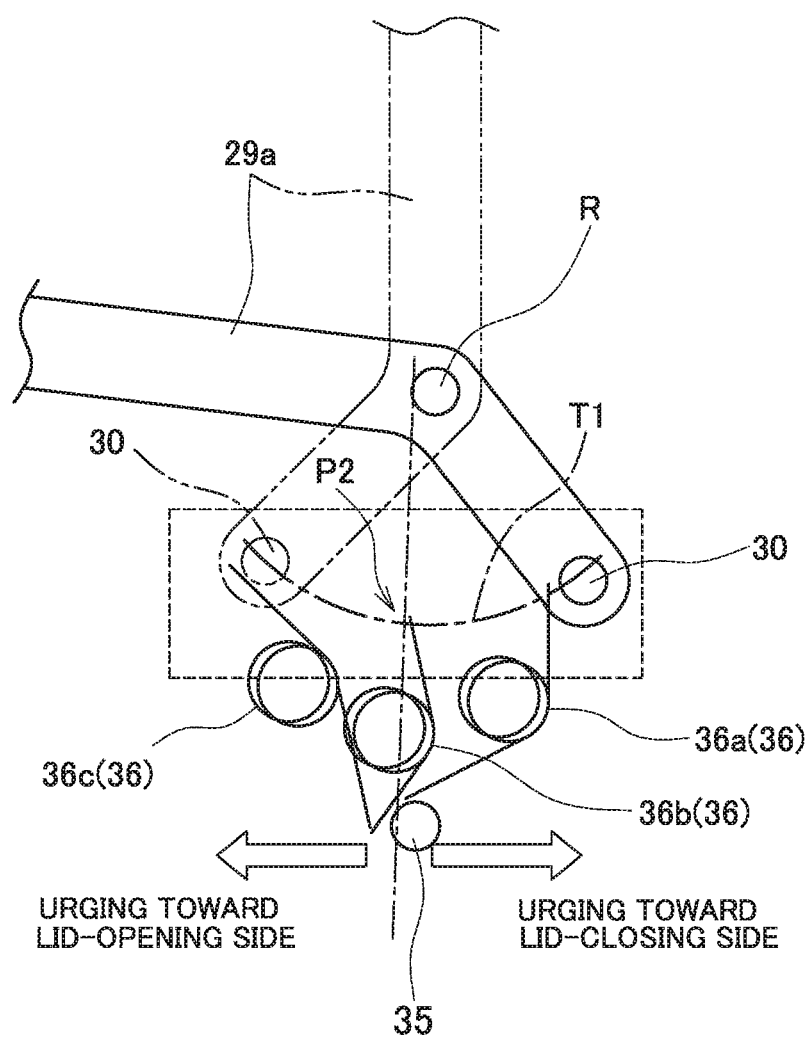
FIG. 8 is a view of an elastic urging structure used in the vehicular article-accommodating structure in FIG. 2A, shown in enlarged form.

As shown in FIG. 8, one upper-side end of the coil spring 36 engages with the link pin 30. One lower-side end of the coil spring 36 engages with the case pin 35. In the present embodiment, a center point P2 of a link rotational trajectory T1 is set so as to be a bottom dead center point 36b of the coil spring 36. Therefore, when the coil spring 36 is on the right side of the center point P2 of the link rotational trajectory T1, as shown by symbol 36a, the coil spring 36 urges the bent link 29a toward the first position shown in FIG. 2B. Conversely, when the coil spring 36 is on the left side of the center point P2 of the link rotational trajectory T1, as shown by symbol 36c, the coil spring 36 urges the bent link 29a toward the second position shown in FIG. 7. Thus, the coil spring 36 urges the lid front part 21a toward either a closed side or an open side, with the trajectory center point P2 as a boundary. This improves operability of the tab 22 by the passenger, and furthermore suppresses unsteadiness of the bent link 29a during closing and opening.

(Operation and Effect)

Because the vehicular article-accommodating structure 19A of the present embodiment is configured as described above, a passenger sitting in the vehicular seat 1 in FIG. 1 can place his or her arm on the upper surface of the arm rest 8 disposed in the usage position in a horizontal state, and can reach a comfortable orientation. The lid 21 of the vehicular article-accommodating structure 19A in FIG. 1 is at a position in which the upper surface of the case 20A is closed, as shown in FIG. 2A. In this position, the lid front part 21 serving as an article support member is at a first position that is a low position. When the passenger has an article being accommodated, e.g., a cup, the cup can be accommodated in an opening 28 in the lid front part 21a. The bottom surface of the accommodated cup is received by the lower part 31a of the bottom part 31 of the case 20A, as shown by symbol 27 in FIG. 2B.

In FIG. 1, when the position of the openings 28 is distant from or lower than the passenger, the passenger hooks a finger on the tab 22 in FIG. 2A and causes the lid rear part 21b to pivot upward using the force of the finger. Thus, the lid front part 21a, which is connected to the lid rear part 21b in such a state as to be capable of medial folding, is raised to the second position that is a high position while the horizontal state of the lid front part 21a is maintained by the working of the links 29a, 29b, as shown in FIG. 5. Due to the working of the parallel link mechanism comprising the links 29a, 29b and the lid rear part 21b, the lid front part 21a performs a translational movement while rising from the first position in FIG. 2A to the second position in FIG. 5.

When the lid front part 21a is raised to the second position shown in FIG. 5, the lid front part 21a advances closer to the passenger (i.e., moves rearward) than at the first position in FIG. 2A by the distance D2, and furthermore advances higher in relation to the passenger than at the first position in FIG. 2A by a height H2. Thus, it becomes easier for the passenger to insert the cup into an opening 28. The bottom surface of the cup inserted into the opening 28 is received by the higher part 31b of the bottom part 31 of the case 20A, as shown by symbol 27 in FIG. 7.

As described above, according to the present embodiment, the lid front part 21a can be disposed at the first position (lower, more distant position) in FIG. 2A, or at the second position (higher, closer position) in FIG. 5, as needed by passengers having different physical builds. Therefore, it is possible for passengers to use the structure with suitable ease.

The bent link 29a is elastically urged toward either the first position in FIG. 2A or the second position in FIG. 5 due to the working of the coil spring 36 provided below the bent link 29a. Therefore, the passenger can cause the lid front part 21a, which serves as the article support member, to move to the first position (lower forward position) or the second position (higher rearward position) without applying excessive force.

Additionally, the lid front part 21*a* is tightly held at the first position (FIG. 2A) or the second position (FIG. 5) due to the spring force of the coil spring 36.

Furthermore, when the lid front part 21*a* in FIG. 6 is disposed at the second position, the bent link 29*a* is inclined rearward by angle α from an angle at which the bent link 29*a* would be vertical, "inclined rearward" referring to a state of being tilted toward the rear; therefore, the lid front part 21*a* can be prevented from faultily moving downward, even when unnecessary force is applied downward from above to the lid front part, e.g., when the passenger mistakenly hits the cup against the lid front part 21*a*.

(Second Embodiment)

Figure 9A:
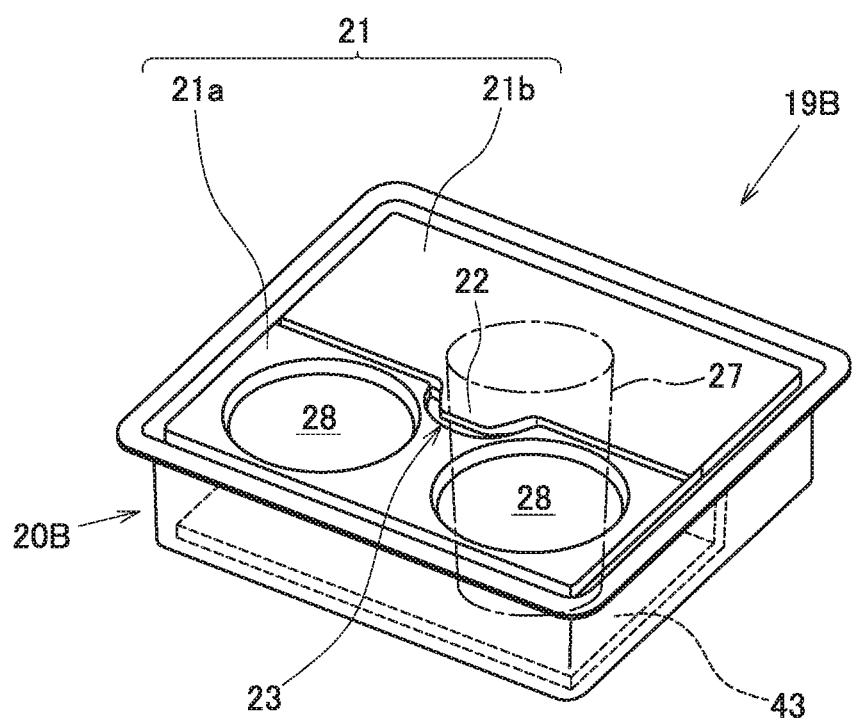
FIG. 9A is a perspective view of another embodiment of a vehicular article-accommodating structure according to the present invention.

FIG. 9A shows another embodiment of a vehicular article-accommodating structure according to the present invention. In the second embodiment here described, members that are the same as in the first embodiment described previously are indicated using the same symbols. The vehicular article-accommodating structure 19B shown in FIG. 9A has a case 20B and a lid 21. The lid 21 constitutes a lid (cover) of the case 20B. The lid 21 has a lid front part 21*a* serving as an article support member, and a lid rear part 21*b* functioning as a link constituting part of a horizontal link mechanism, as shown in FIG. 3A.

An opening 28 for accommodating a beverage container; i.e., a cup 27 that serves as an article being accommodated is opened in the lid front part 21*a*. In the present embodiment as well, two openings 28 are provided. The size (i.e., diameter) of the openings 28 is greater than the cross-sectional diameter of the cup 27, but is also set such that tipping and falling of the cup 27 can be prevented.

Figure 10:
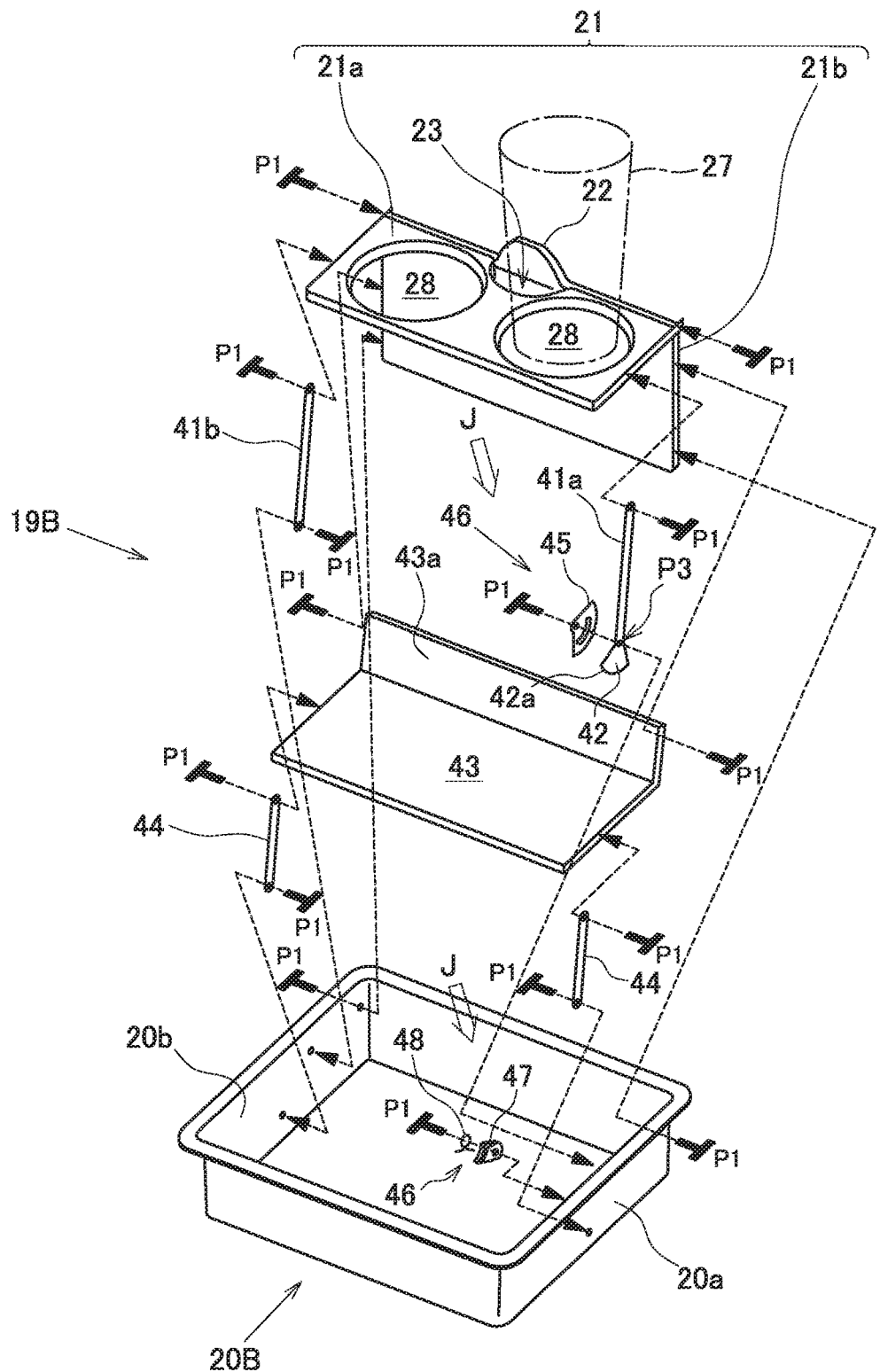
FIG. 10 is an exploded perspective view of the vehicular article-accommodating structure in FIG. 9A.

FIG. 10 shows an exploded perspective view of the vehicular article-accommodating structure 19B in FIG. 9A. In FIG. 10, the two sides of the rear end of the lid front part 21*a* and the two sides of the front end of the lid rear part 21*b* are pivotably connected to each other by pins P1, P1. Therefore, the lid front part 21*a* and the lid rear part 21*b* perform relative pivoting about a connection point Q due to the respective weights thereof, as shown by arrows B-B' in FIG. 3B. Due to this relative pivoting, the lid 21 constitutes a structure that can undergo medial folding at the location of the connection point Q. The symbols P1 in FIG. 10 indicate rotatable connection.

A tab 22 is provided at the central part of the front end of the lid rear part 21*b*. A recess 23 is provided to the lid front part 21*a* in a region that corresponds to the tab 22. The relationship between the tab 22 and the recess 23 is the same as in the first embodiment described previously.

In FIG. 10, no stepped shape or no tiered configuration is provided to the bottom part of the case 20B in the present embodiment. The two sides of the rear end (lower end in FIG. 10) of the lid rear part 21*b* are pivotably linked to the inner surfaces on the rear parts of the two side surfaces 20*a*, 20*b* of the case 20B. The upper end of a geared lid link 41*a* is pivotably connected to the right side surface of the lid front part 21*a*. The upper end part P3 of a gear part 42 of the geared lid link 41*a* is pivotably connected to the inner surface of the right-side surface 20*a* of the case 20B. A gear 42*a* is formed on the outer-peripheral surface of the gear part 42. The upper end of a linear lid link 41*b* is pivotably connected to the left side surface of the lid front part 21*a*. The lower end of the linear lid link 41*b* is pivotably connected to the inner surface of the left-side surface 20*b* of the case 20B.

The geared lid link 41*a*, the linear lid link 41*b*, and the lid rear part 21*b* function as an article-support-member movement device for causing the lid front part 21*a* to perform a translational movement. The working of the article-support-member movement device causes the lid front part 21*a* to perform a translational movement between a first position (i.e., a lowest-level position in which the lid front part 21*a* serves as a cover to close the upper-end opening of the case 20B) shown in FIG. 9A and a second position (i.e., a highest-level position) shown in FIG. 11A while the horizontal state of the lid front part 21*a* is constantly maintained. The lid front part 21*a* can also move to a rearward-most position shown in FIG. 12A, the rearward-most position being inclined further in a rearward direction E than is the second position.

A cushion 43 is provided to the interior of the case 20B as an article-bottom-surface-receiving member. The cushion 43 is a member for receiving the bottom surface of the cup 27 that serves as the accommodated article. In FIG. 10, the rear end part of the cushion 43 is formed into an upright part 43*a* that stands upwardly erect, and the two sides of the upper end part of the upright part 43*a* are pivotably connected respectively to the two sides of the lid rear part 21*b*. The locations where the cushion upright part 43*a* and the lid rear part 21*b* are connected can also be set to portions other than the side surface parts of the upright part 43*a*. Provided that the cushion 43 and the lid rear part 21*b* constitute part of a link mechanism, it is not necessarily required to include an upright part 43*a*. The upper ends of cushion links 44, 44 are pivotably connected to the two side surfaces of the horizontal part of the cushion 43. The lower ends of the cushion links 44, 44 are pivotably connected to the inner surfaces of the two side surfaces 20*a*, 20*b* of the case 20B.

Figure 11A:
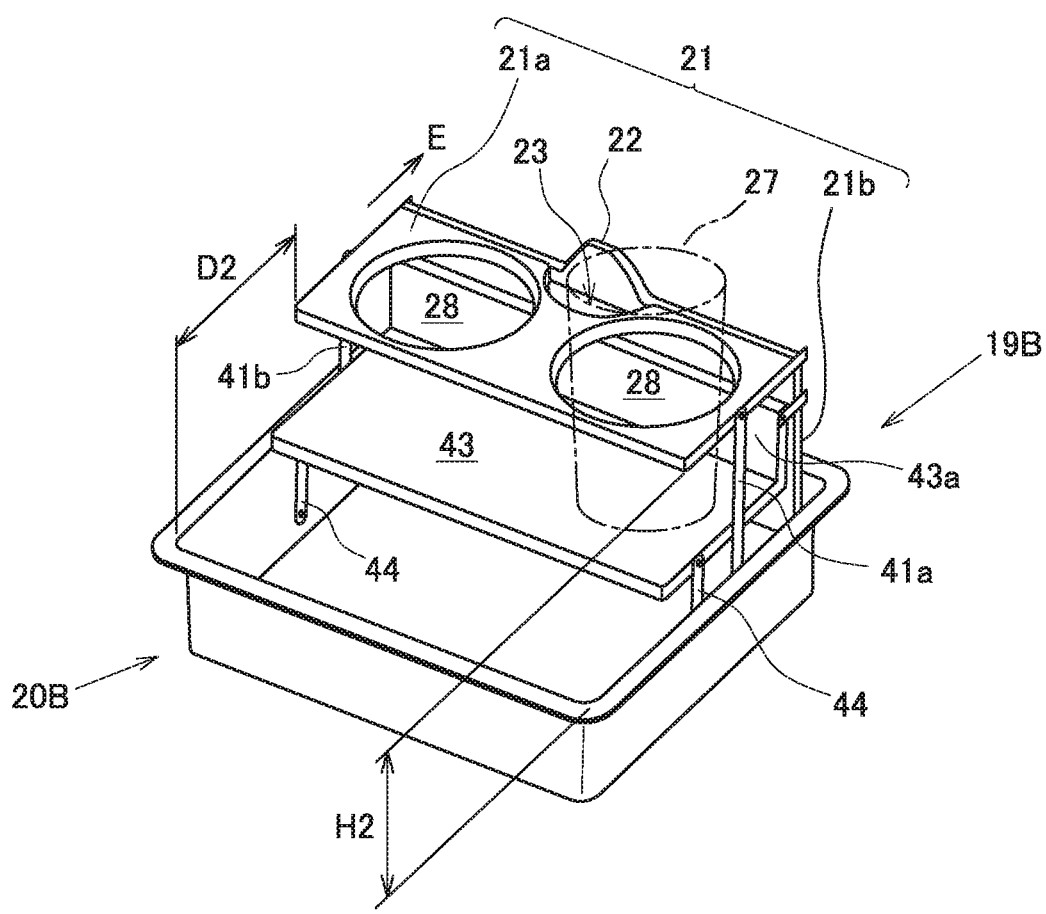
FIG. 11A is a perspective view showing movement of the vehicular article-accommodating structure in FIG. 9A.
Figure 11B:
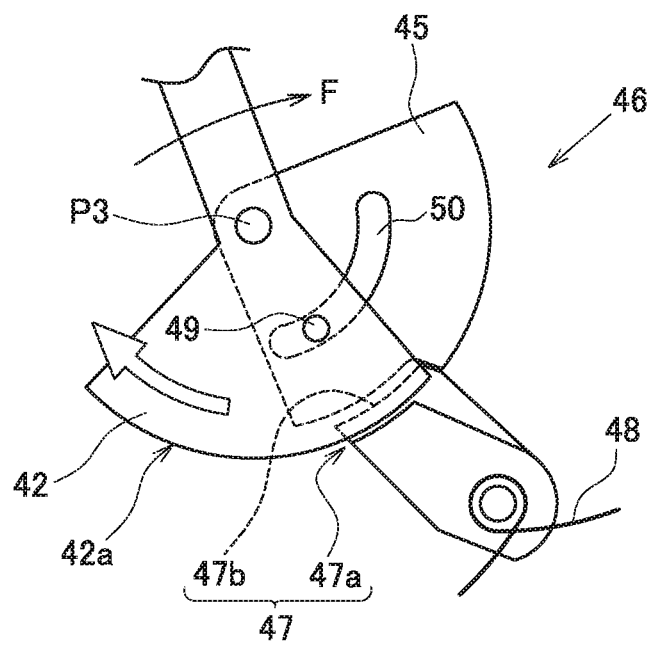
FIG. 11B is a view showing the state of the ratchet mechanism when in the state shown in FIG. 11A.

Due to the above configuration relating to the cushion 43, the lid rear part 21*b*, and the cushion links 44, the cushion 43 performs a translational movement between the first position (i.e., the lowest-level position) shown in FIG. 9A and the second position (i.e., the highest-level position) shown in FIG. 11A while the horizontal state of the cushion 43 is constantly maintained. The lid front part 21*a* can also move to the rearward-most position shown in FIG. 12A, the rearward-most position being inclined further in a rearward direction E than is the second position. While the cushion 43 performs a translational movement between the first position in FIG. 9A and the second position in FIG. 11A, the cushion 43 is constantly in a state in which it is possible to receive the bottom surface of the cup 27.

FIG. 10, FIG. 13A, and FIG. 13B show a ratchet mechanism 46. The ratchet mechanism 46 allows the geared lid link 41*a* in FIG. 13A to pivot toward an opening direction F, and inhibits the geared lid link 41*a* from pivoting toward a closing direction G that opposes the opening direction F. The operation of the geared lid link 41*a* is thus limited to a single direction by the ratchet mechanism 46, whereby the lid front part 21*a* in FIG. 10 is allowed to move from the first position in FIG. 9A to the second position in FIG. 11A, but is inhibited from moving in the opposite direction. This makes it possible for the lid front part 21*a* to stop at intermediate positions that vary continuously between the first position (low position) and the second position (high position).

FIG. 13A is a diagram of the ratchet mechanism 46 as viewed from the direction of arrow J in FIG. 10. FIG. 13B is a diagram of the ratchet mechanism 46 as viewed from the direction of arrows L in FIG. 13A. As shown in FIG. 13A and FIG. 13B, a cam 45 is rotatably attached to the gear part 42 of the geared lid link 41a. A protrusion 49 provided to the gear part 42 is inserted into an arcuate notch 50 in the cam 45.

A gear unit 47 is rotatably attached to the side surface 20a of the case 20B. The gear unit 47 has a gear 47a and an engagement part 47b. The gear 47a of the gear unit 47 meshes with the gear 42a of the gear part 42 of the geared lid link 41a. The engagement part 47b of the gear unit 47 engages the cam 45. A coil spring 48 is fixed to the gear unit 47. The coil spring 48 urges the gear unit 47 in a direction in which the gear 47a of the gear unit 47 meshes with the gear 42a of the geared lid link 41a.

When a force is applied so as to cause the geared lid link 41a in FIG. 13A to pivot in the direction of arrow G (downward), e.g., when a cup is disposed in the vehicular article-accommodating structure 19B, the gear unit 47 operates in the direction in which the gear 47a of the gear unit 47 meshes with the gear 42a of the geared lid link 41a, whereby the position of the geared lid link 41a is retained; as a result, the positions of the lid front part 21a and the cushion 43 are retained.

When a force is applied so as to cause the geared lid link 41a in FIG. 13A to pivot in the direction of arrow F (upward), e.g., when a passenger raises the lid 21 upward by the tab 22 of the lid 21; i.e., when the lid front part 21a in FIG. 9A is raised from the first position in FIG. 9A to the second position in FIG. 11A, the gear 47a pivots in the direction of arrow U while riding up over the gear 42a of the geared lid link 41a due to the force of rotation of the geared lid link 41a, and after riding over the gear 42a of the geared lid link 41a, meshes with the gear 42a again due to the spring force of the coil spring 48. This meshing inhibits the geared lid link 41a from pivoting in a direction opposite a raising direction shown by the arrow F. Specifically, pivoting in a direction opposite the raising direction (F direction) of the geared lid link 41a is locked. While pivoting of the geared lid link 41a in the raising direction (F direction) continues, the gear 47a repeatedly rides over and meshes with the gear 42a. At this time, the protrusion 49 provided to the side surface of the gear part 42 of the geared lid link 41a moves within the arcuate notch 50 in the cam 45. The cam 45 does not rotate at this time.

Figure 12A:
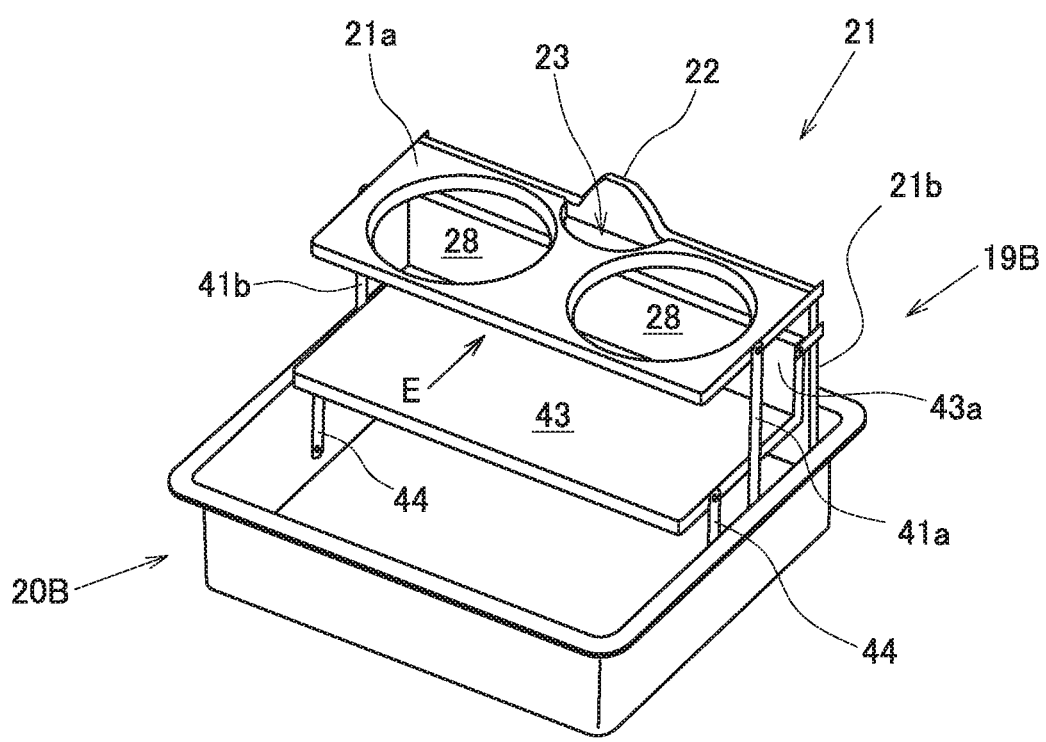
FIG. 12A is a perspective view showing another movement of the vehicular article-accommodating structure in FIG. 9A.
Figure 12B:
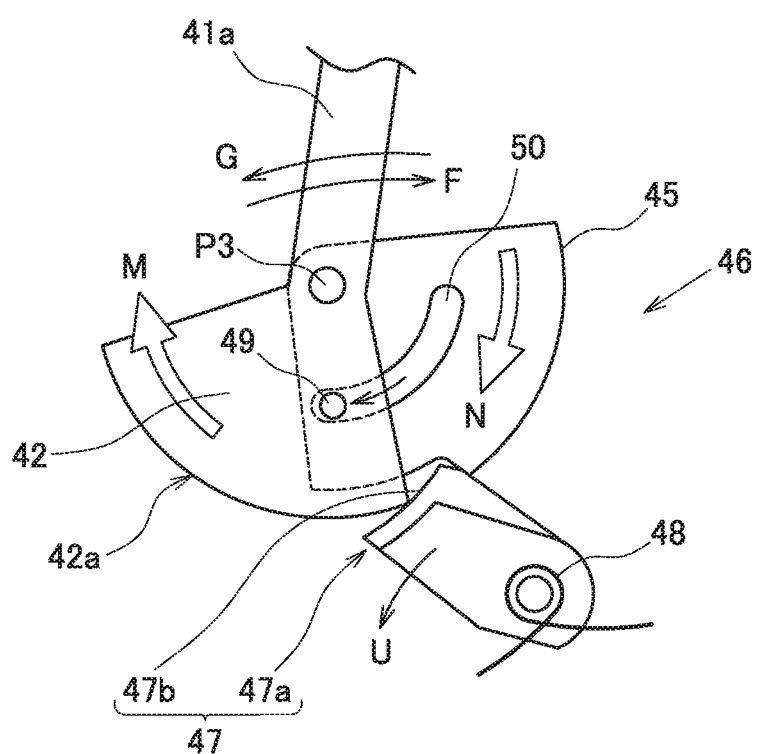
FIG. 12B is a view showing the state of the ratchet mechanism when in the state shown in FIG. 12A.
Figure 14:
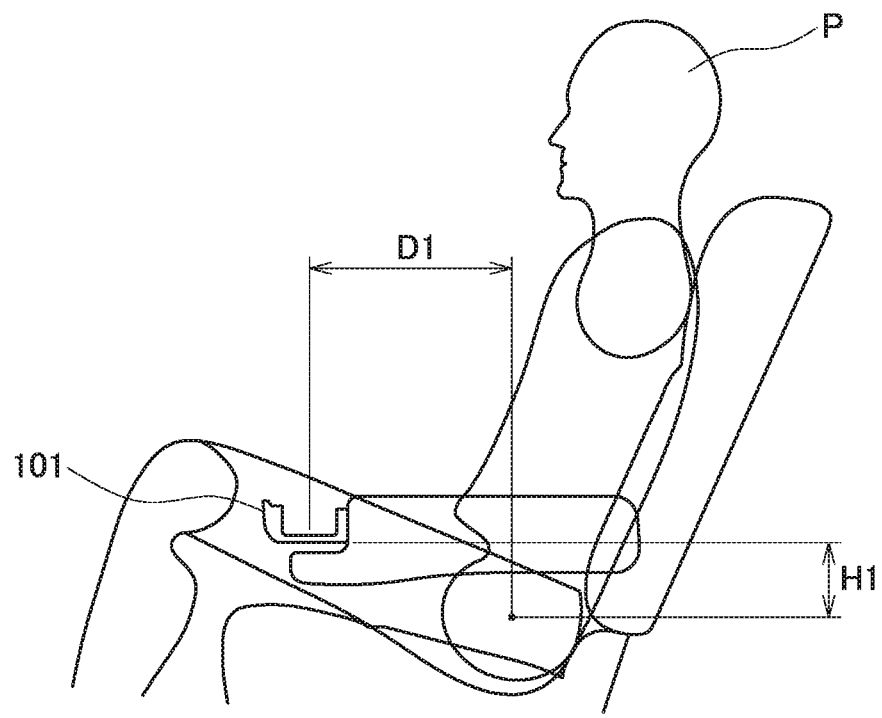
FIG. 14 is a view of one example of a conventional vehicular article-accommodating structure.

When the lid front part 21a is caused to move from the second position (highest-level position) in FIG. 11A further to the rearward-most inclined position in FIG. 12A, as shown by arrow M in FIG. 12B, the side-surface protrusion 49 of the gear part 42 of the geared lid link 41a pushes one end surface of the arcuate notch 50 in the cam 45, and causes the cam 45 to rotate as shown by arrow N. The gear unit 47 rotates as shown by arrow U due to the rotation of the cam 45, and the meshing of the geared lid link 41a and the gear 47a is correspondingly released. Specifically, the locked state is released. This makes it possible to cause the geared lid link 41a to close and move in the direction of the arrow G.

Figure 9B:
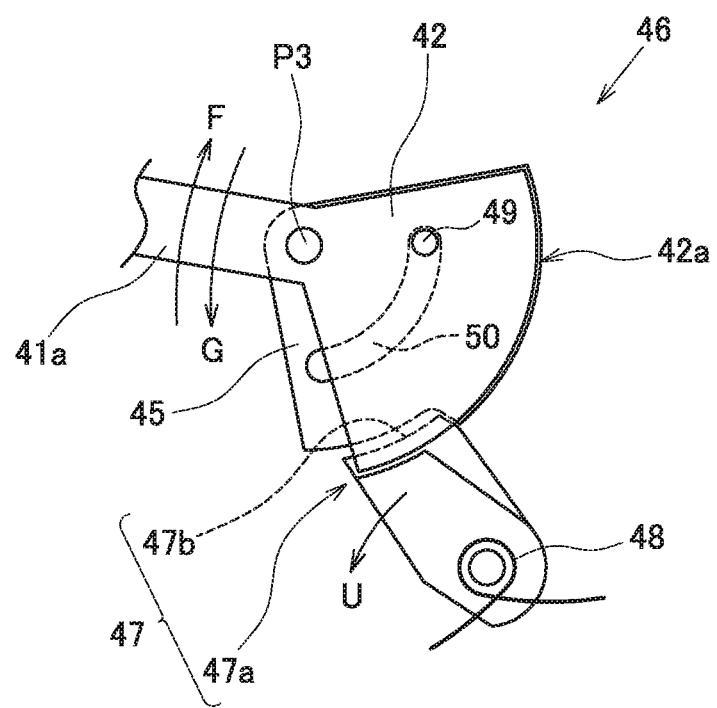
FIG. 9B is a view showing the state of a ratchet mechanism when in the state shown in FIG. 9A.

When the lid 21 is closed as shown in FIG. 9A, the side-surface protrusion 49 of the gear part 42 of the geared lid link 41a in FIG. 9B pushes the other end surface of the arcuate notch 50 in the cam 45. The cam 45 thereby rotates, and the gear unit 47 returns to the original state due to the spring force of the coil spring 48; as a result, the gear 47a again enters a lockable state.

(Operation and Effect)

In FIG. 1, when the position of the openings 28 is distant from or lower than the passenger, the passenger hooks a finger on the tab 22 in FIG. 9A and causes the lid rear part 21b to pivot upward using the force of the finger. Thus, the lid front part 21a, which is connected to the lid rear part 21b in such a state as to be capable of medial folding, is raised to the second position (position shown in FIG. 11A) that is a high position while the horizontal state of the lid front part 21a is maintained by the working of the geared lid link 41a and the linear lid link 41b, as shown in FIG. 11A. Due to the working of the parallel link mechanism comprising the geared lid link 41a, the linear lid link 41b, and the lid rear part 21b, the lid front part 21a performs a translational movement while rising from the first position in FIG. 9A to the second position in FIG. 11A.

When the lid front part 21a is raised to the second position shown in FIG. 11A, the lid front part 21a advances closer to the passenger (i.e., moves rearward) than at the first position in FIG. 9A by the distance D2, and furthermore advances higher in relation to the passenger than at the first position in FIG. 9A by the height H2. Thus, it becomes easier for the passenger to insert the cup into an opening 28. The bottom surface of the cup inserted into the opening 28 is received by the cushion 43.

As described above, according to the present embodiment, the lid front part 21a can be disposed at the first position (lower, more distant position) in FIG. 9A, or at the second position (higher, closer position) in FIG. 11A, as needed by passengers having different physical builds. Therefore, it is possible for passengers to use the structure with suitable ease.

In the present embodiment, the lid front part 21a serving as an article support member in FIG. 9A can stop at intermediate positions between the first position in FIG. 9A and the second position in FIG. 11A due to the working of the ratchet mechanism 46 shown in FIG. 13A and FIG. 13B. Moreover, the cushion 43 can be caused to move synchronously with the movement of the lid front part 21a. As a result, the cup 27 that serves as the accommodated article can be disposed at positions that vary continuously. This makes it possible to enhance the level of convenience for the passenger.

(Other Embodiments)

The present invention was described above through the example of the preferred embodiments. However, the present invention is not limited to these embodiments; various modifications can be made within the scope of the invention described in the claims.

For example, in the embodiment shown in FIG. 1, the present invention was applied to an arm rest 8 provided to a rear seat of a vehicle, the rear seat seating two or three people. However, the present invention can also be applied to an arm rest provided to a front seat.

Additionally, the present invention can be applied to vehicular components other than an arm rest, such as a console or other such component.

Additionally, the article support member is not limited to only the structure of the lid front part 21a shown in FIG. 2A and FIG. 9A; any other structure can be employed, as needed.

Additionally, the article-support-member movement device is not limited to only the parallel link structure shown in FIG. 4 and FIG. 10; a translational movement mechanism having any other structure can be employed, as needed.

Additionally, as shown in FIG. 4 and FIG. 10 in the embodiments described above, the member for receiving the bottom surface of the cup 27 was integrally provided to the case 20A, 20B. However, the member for receiving the bottom surface of the cup 27 can also be provided separately from the case.

DESCRIPTION OF SYMBOLS

1: Vehicular seat, 2: Seat cushion, 3A,3B: Seat back, 4: Headrest, 8: Arm rest, 9: Shaft member, 10: Seat back frame (framework structure), 11: Pad, 12: surface skin, 13: Frame, 14: Pad, 15: Surface skin, 19A,19B: Vehicular article-accommodating structure, 20A,20B: Case, 20a,20b: Side surface, 21: Lid (cover), 21a: Lid front part (article support member), 21b: Lid rear part (parallel link mechanism), 22: Tab, 23: Recess, 27: Cup (beverage container, article being accommodated), 28: Opening, 29a: Bent link (parallel link mechanism), 29b: Linear link (parallel link mechanism), 30: Pin, 31: Bottom part, 31a: Lower part (article-bottom-surface-receiving member), 31b: Upper part (article-bottom-surface-receiving member), 35: Case pin, 36: Coil spring, 41a: Geared lid link, 41b: Linear lid link, 42: Gear part, 42a: Gear. 43: Cushion (article-bottom-surface-receiving member), 43a: Upright part, 44: Cushion link, 45: Cam, 46: Ratchet mechanism, 47: Gear unit, 47a: Gear, 47b: Engagement part, 48: Coil spring, 49: Protrusion, 50: Arcuate notch, 101: Cup holder, D1,D2: Distance, d1: Gap, E: Rearward inclination direction, F: Opening direction, G: Closing direction, H1,H2: Height, K: Space, P: Passenger, P1: Pin, P2: Center point, P3: Upper end part of gear part, Q: Connection point, R: Point near bending point, T1: Rotation trajectory, W1: Width of tab, α: Angle of rearward inclination

The invention claimed is:

1. A vehicular article-accommodating structure, comprising:
   an article support member provided with an opening of such size as to be larger than a cross-sectional diameter of an article being accommodated but also configured to prevent tipping and falling of the accommodated article;
   an article-support-member movement device for causing the article support member to perform a translational movement between a first position and a second position;
   an article-bottom-surface-receiving member for receiving the bottom surface of the accommodated article between the first position and the second position; and
   a case for which the article support member serves as a cover, wherein the first position is a position at which the article support member is the cover for the case,
   wherein the second position is a high position having a height greater than that of the first position, and is a position rearward from the first position, and
   wherein the article-support-member movement device is a parallel link mechanism provided between the case and the, article support member.

2. The vehicular article-accommodating structure according to claim 1, wherein the article-bottom-surface-receiving member is a tiered configuration provided to the case.

3. The vehicular article-accommodating structure according to claim 1, wherein the link angle of the parallel link mechanism is set so as to be inclined rearward when the second position is assumed.

4. The vehicular article-accommodating structure according to claim 1, further comprising a lid that serves as a cover for the case, wherein:
   the lid has a lid front part and a lid rear part connected so as to be capable of pivoting relative to each other;
   the lid front part constitutes the article support member; and
   the lid rear part constitutes part of the parallel link mechanism.

5. The vehicular article-accommodating structure according to claim 4, wherein the lid rear part comprises a tab at the portion where the lid rear part and the lid front part are connected.

6. The vehicular article-accommodating structure according to claim 5, wherein
   the lid front part comprises a recess at a position corresponding to the tab, the recess accommodating the tab, and
   the recess is of such size as to allow part of a finger to be inserted around the tab.

7. An arm rest for receiving an arm of a passenger, comprising a vehicular article-accommodating structure for accommodating an article being accommodated, and the vehicular article-accommodating structure is the vehicular article-accommodating structure according to claim 1.

8. A vehicular seat comprising a seat cushion for receiving the buttocks of a passenger, a seat back for receiving the back of the passenger, and a vehicular article-accommodating structure for accommodating an article being accommodated, wherein
   the vehicular article-accommodating structure is the vehicular article-accommodating structure according to claim 1.

9. A vehicular article-accommodating structure, comprising:
   an article support member provided with an opening of such size as to be larger than the cross-sectional diameter of an article being accommodated but also configured to prevent tipping and falling of the accommodated article;
   an article-support-member movement device for causing the article support member to perform a translational movement between a first position and a second position;
   a ratchet device for allowing the article support member to move from the first position to the second position and inhibiting the article support member from moving from the second position to the first position;
   an article-bottom-surface-receiving member for receiving the bottom surface of the accommodated article between the first position and the second position; and
   a case for which the article support member serves as a cover, wherein the first position is a position at which the article support member is the cover for the case,
   wherein the second position is a high position having a height greater than that of the first position, and is a position rearward from the first position, and
   wherein the article-support-member movement device is a parallel link mechanism provided between the case and the article support member.

10. The vehicular article-accommodating structure according to claim 9, wherein the article-bottom-surface-receiving member performs a translational movement synchronously with the article support member.

11. The vehicular article-accommodating structure according to claim 9, further comprising a lid that serves as a cover for the case, wherein:
    the lid has a lid front part and a lid rear part connected so as to be capable of pivoting relative to each other;
    the lid front part constitutes the article support member; and
    the lid rear part constitutes part of the parallel link mechanism.

12. The vehicular article-accommodating structure according to claim 11, wherein the lid rear part comprises a tab at the portion where the lid rear part and the lid front part are connected.

13. The vehicular article-accommodating structure according to claim 12, wherein
- the lid front part comprises a recess at a position corresponding to the tab, the recess accommodating the tab, and
- the recess is of such size as to allow part of a finger to he inserted around the tab.

14. An arm rest for receiving an arm of a passenger, comprising a vehicular article-accommodating structure for accommodating an article being accommodated, and the vehicular article-accommodating structure is the vehicular article-accommodating structure according to claim 9.

15. A vehicular seat comprising a seat cushion for receiving the buttocks of a passenger, a seat back for receiving the back of the passenger, and a vehicular article-accommodating structure for accommodating an article being accommodated, wherein
- the vehicular article-accommodating structure is the vehicular article-accommodating structure according to claim 9.

* * * * *